United States Patent [19]
Dasher et al.

[11] 3,785,729
[45] Jan. 15, 1974

[54] OVERHEAD PROJECTOR ROLLER ASSEMBLY

[76] Inventors: Kenneth R. Dasher; Cyndia H. Dasher, both of 487 S. Allegheny, Tulsa, Okla. 74112

[22] Filed: Mar. 1, 1971

[21] Appl. No.: 122,579

[52] U.S. Cl............... 353/122, 242/67.4, 242/71.2, 242/77.2, 353/23, 353/44, 353/99
[51] Int. Cl. .................... G03b 21/132, B65h 17/02
[58] Field of Search................ 242/67.3, 67.4, 55.2, 242/77.2, 71.2, 55, 67.5; 353/22, 23, 44, 45, 81, 98, 99, 96, 78, 95, 71, 68, 122; 40/86; 35/31

[56] References Cited
UNITED STATES PATENTS

| | | | |
|---|---|---|---|
| 1,023,587 | 4/1912 | Nederland | 242/55.2 |
| 1,499,016 | 6/1924 | Guyton | 242/67.3 R |
| 2,078,081 | 4/1937 | Kramer | 242/77.2 |
| 3,138,081 | 6/1964 | Nerwin | 242/71.2 X |
| 3,457,662 | 7/1969 | Rau | 40/86 R |
| 3,510,214 | 5/1970 | Crow | 353/98 X |

*Primary Examiner*—George F. Mautz
*Attorney*—Robert E. Massa

[57] ABSTRACT

A roller device for use with an overhead projector comprises a frame having a roller mounted at each end. The frame is designed to be positionable on the horizontal ground glass optical member or lens of the typical overhead projector. The rollers are positioned on the frame at a point where the frame extends beyond the horizontal optical member of the projector, and the rollers are further positioned in a plane slightly below the plane of the horizontal member so that a sheet of transparent writing material as described above may move from its supply position on each roller and be parallel to and in close proximity to the optical member of the projector as it passes over that member. Thus, indicia may be placed upon the transparent writing material at will.

6 Claims, 8 Drawing Figures

INVENTORS.
KENNETH R. DASHER
CYNDIA H. DASHER

BY

ATTORNEY

OVERHEAD PROJECTOR ROLLER ASSEMBLY

BACKGROUND OF THE INVENTION

This invention relates to devices for projection of indicia. More particularly, this invention relates to devices for positioning indicia in a projectionable mode on a projector of the type commonly known as "overhead projectors." Still more particularly, this invention relates to adapter assemblages capable of presenting indicia to an overhead projector for projection upon a suitable receptor.

Projecting device of the type known as "overhead projectors" have long been known and widely used. These are commonly of the type suitable for projecting an opaque page of writing, such as a page of a book, onto a screen, or of a type suitable for projecting a series of indicia marked on a transparent film onto a screen. One type of projecting device for projecting indicia from a transparent film onto a screen employs a series of mirrors in conjunction with a light source and a condensing lens such as is described in U.S. Pat. No. 3,059,529 to Lucas. In such a device, the light source may be integral or separate. Another type of projector for projecting indicia from a transparent film is described generally in FIG. 1 of U.S. Pat. No. 3,510,214 to Crow. In this type a light source is located below a Fresnel lens placed adjacent the indicia and between the light source and the indicia in a manner to project the indicia onto a lens or prism system which then projects the images onto a screen. Each of these patents cited above also describe specific adapter devices for use with specific types of projectors.

SUMMARY OF THE INVENTION

Therefore, the primary object of this invention is to provide an adapter device for an overhead projector which may be easily and conveniently used with various types of overhead projectors.

Another object of this invention is to provide an adapter device for use with various types of overhead projectors which device is inexpensive, easy to manufacture, and simple to use.

Still another object of this invention is to provide an adapter device for overhead projectors which is quickly positionable upon the projector and quickly removable therefrom.

Still another object of this invention is to provide an adapter device for overhead projectors which has a minimum number of parts and is easy to operate.

Still another object of this invention is to provide a lightweight adapter roller device for an overhead projector which rests upon a display area of said projector during use in an unattached condition.

These and other objects of the invention will become apparent from the accompanying drawings which describe the invention as comprising a lightweight frame member positionable adjacent to and parallel to a display area of an overhead projector in which the frame member has a central portion comprising a major part of the frame to permit passage of light from a source of illumination thru the central portion, and roller means mounted adjacent each end of the frame for holding a supply of transparent sheet material upon which indicia may be recorded, each of the roller means mounted in a manner that an upper part of the circumference of each of the roller means is substantially tangential to the plane of the central portion so that the transparent material may pass smoothly from one roller to the other.

The adapter device of this invention is designed to rest unattachably upon the conventional ground glass, or similar material, display area of an overhead projector so that the adapter of this invention may be suitably employed with a wide variety of overhead projectors. By being formed of lightweight material, such as wire or the like, the adapter of this invention is more readily employable with overhead projectors of various types with less interference from obstructing portions of the projectors than would be a similar adapter formed of sheet metal which would comprise a broad framework which would be easily interfered with by obstructions of the projector such as an upstanding post which holds the light directing prisms or mirrors.

The adapter device of this invention is designed so that a roll of transparent flexible material, such as Saran, may be easily and quickly installed and fed to the second roller. In this manner, a very inexpensive material may be employed for marking indicia, such as writing or drawings, and may be easily erasable or otherwise disposed of.

DESCRIPTION OF THE PREFERRED EMBODIMENTS

An adapter roller device in accordance with this invention for use with an overhead projector which has a display area between a source of illumination and light directing means comprises a frame member having a central portion positionable adjacent to and parallel to the display area, the central portion having an opening therein to permit passage of light from the source of illumination, and the frame member further having two end portions in a different plane than the central portion, and roller means mounted on each end portion for holding a supply of transparent sheet material upon which indicia may be recorded, the roller means so mounted on each end portion that a circumference of the roller means is substantially tangential to the plane of the central portion.

Figure 1:
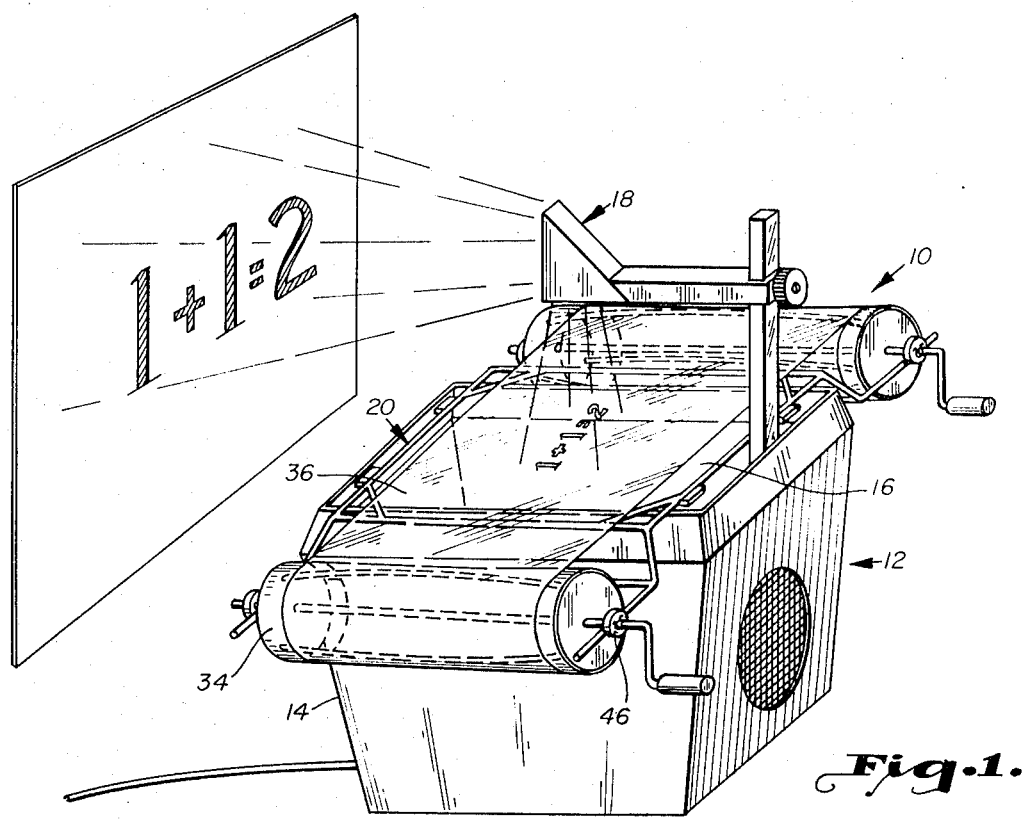
FIG. 1 is a perspective view of a roller device according to this invention shown in position on a conventional overhead projector.

FIG. 1 describes an adapter roller device 10, generally, in position upon a typical conventional overhead projector 12, generally. The usual overhead projector of this type includes a source of illumination (not shown) within a lower body portion 14, a display area 16, and a focusing assemblage 18. The display area 16 is usually either a sheet of clear plate glass or a sheet of glass ground into a Fresnel lens. The focusing assemblage 18 usually includes an adjustable series of lenses and either mirrors or prisms.

As shown in FIG. 1, an adapter roller device 10 according to this invention is preferably formed of rather thin, stiff, wire-like material in order for the device to be more readily adaptable to various kinds of overhead projectors. The roller device 10 comprises a frame member 20, generally, including a pair of side members 22 secured to each other and supported by transverse members 24. As more clearly shown in FIG. 2, the frame member 20 is given additional support and strengthening by inclusion of braces 26. If desired, further bracing may be provided by addition of corner braces 28.

Figures 2, 3:
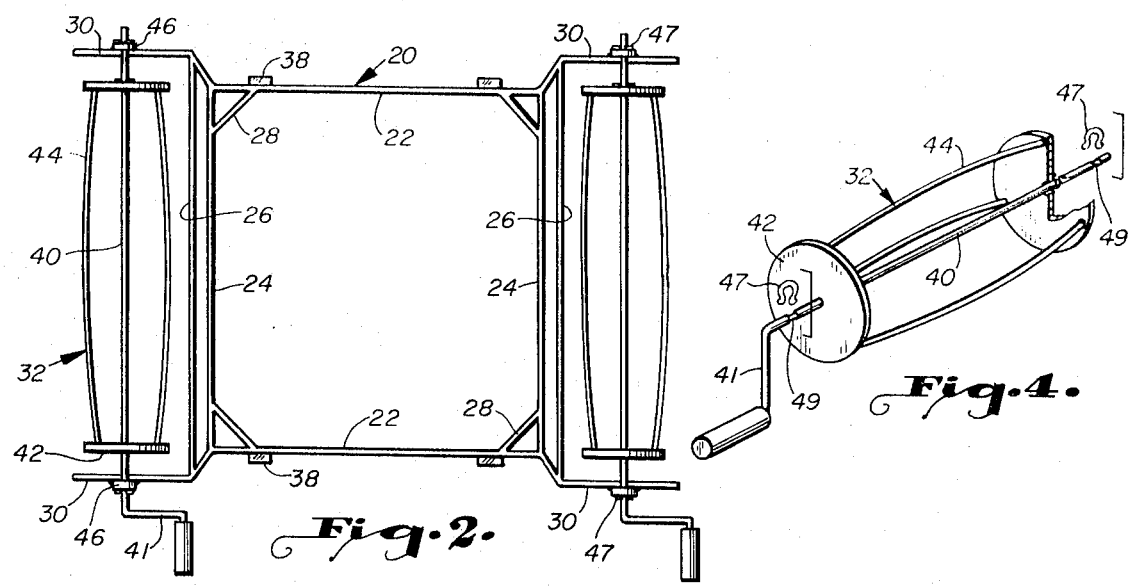
FIG. 2 is a top view of an adapter roller device according to this invention.
FIG. 3 is a side elevational view of an adapter roller device according to this invention.

As clearly shown in FIG. 3, side members 22 are bent near each end to form an end portion 30 in a different plane parallel to side member 22. Thus, a roller assembly 32, generally, is mounted on each end portion 30 in a manner that the plane of a surface of roller assembly 32 will be substantially tangential to the plane of side member 22. Mounting the roller assembly in this manner permits a roll of transparent flexible material such as Saran 34, as shown in FIG. 1, so that when a film of transparent material 36 is suitably mounted, the film 36 would substantially describe a planar configuration from roller to roller as indicated in FIG. 3. By being mounted in this manner. the rollers are more easily operated.

When the adapter roller device 10 is positioned upon a projector, the frame member is raised slightly above the surface of the display area 16 by the inclusion of supports 38 which in most cases provide from approximately a 1/32 inch clearance. It should be noted here too that if desired, or if made necessary by the configuration of the overhead projector itself, the adapter roller device 10 may be mounted on a projector in the manner shown in FIG. 1, or because of the provision of the supports 38, the roller device may be mounted on the projector in an upside-down position. That is, supports 38 permit the device to be turned over with the film material passing between the display area and the frame and still pass freely from roller to roller.

Figure 4:
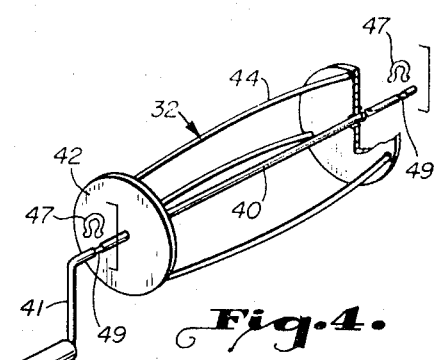
FIG. 4 is a perspective view, partly fragmentary, of one form of end roller component of an adapter roller device according to this invention.
Figure 5:
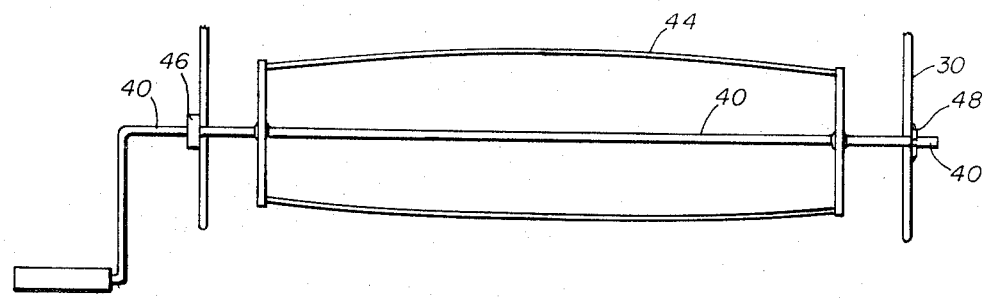
FIG. 5 is an elevational view of an alternate embodiment of an end roller of an adapter roller device according to this invention.
Figure 6:
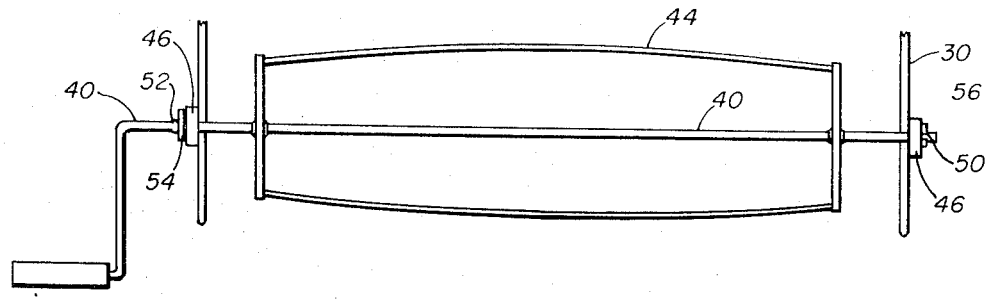
FIG. 6 is an elevational view of another alternate embodiment of an end roller component of an adapter roller device according to this invention.
Figure 8:
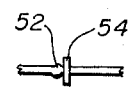
FIG. 8 is a fragmentary elevational view of an end roller component according to this invention showing one means of holding an end roller in position.
Figure 7:
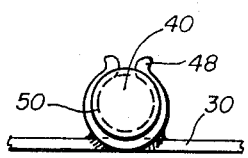
FIG. 7 is an elevational view of a portion of an adapter roller device according to this invention showing one means of mounting an end roller.

Roller assembly 32 includes a central shaft 40 upon which is secured a pair of disc-like members 42 between which are attached tensionable holder members 44 which preferably are biased slightly outwardly in order to hold more securely roll 34. Shaft 40 terminates in a crank arm 41. Shaft 40 may be mounted thru a bearing 46 which is secured to end portion 30, or, as shown in FIGS. 5 and 7, shaft 40 may be held removably in a clip 48 attached to end portion 30. FIG. 4 also describes one means of holding roller assembly 32 in position upon the device. A clip 47 is removably engaged with a groove 49 in shaft 40. When mounted as shown in FIGS. 5 and 7, roller assembly 32 may be easily detached from clip 48 by slight upward pressure so that a roll of transparent material may be placed on roller assembly 32. Preferably, when a clip 48 is employed to secure shaft 40, a groove 50 is provided in shaft 40 to prevent transverse movement of roller assembly 32. As disclosed in FIG. 6, another means of holding roller assembly 32 in position is shown. At one end of shaft 40 a crimp 52 is made in shaft 40 as one means of preventing transverse movement of shaft 40, and is protected from abrasive movement against bearing 46 by provision of a washer 54. At the other end of shaft 40, shaft 40 passes thru a bearing 46 secured to end portion 30 and is further held from transverse movement by means of a removable clip 56 held in groove 50 of shaft 40. Thus, a roll of transparent material may be placed on roller assembly 32 by easy removal of clip 56 which permits the end of shaft 40 to be passed thru bearing 46 and tilted slightly so that the new roll may be placed on the assembly.

Since many different embodiments of this invention may be made without deparing from the spirit and scope thereof, it is to be understood that the specific embodiments described in detail herein are not to be taken in a limiting sense, since the scope of the invention is best defined by the appended claims.

We claim:

1. A roller device for use with an overhead projector having a display area between a source of illumination and light-directing means, said device for resting unattachably upon said projector and comprising a wire frame comprising a pair of side members secured to a pair of transverse members in a manner to form a central portion positionable adjacent to and parallel to said display area, said central portion having an opening therein to permit passage of light from said source of illumination, said side members extending outwardly and downwardly to form two end portions said two end portions being located in a different plane than said central portion, said plane being spaced below and parallel to the plane of said central portion, and roller means for holding a supply of transparent sheet material upon which indicia may be recorded, means mounting said roller means on each of said end portions, the radial size of said roller means being substantially equal to the spacing between the planes of the central and end portions whereby the circumference of said roller means when mounted on said end portions is substantially tangential to the plane of said central portion.

2. A roller device for use with an overhead projector as described in claim 1, wherein said central portion includes support means to position said frame member slightly away from said display area.

3. A roller device for use with an overhead projector as described in claim 2, wherein said means mounting said roller means includes means removably mounting said roller means on each end portion.

4. A roller device for use with an overhead projector as described in claim 3, wherein said roller means includes a roller member attached to an axle and an axle thereof extends to a crank member.

5. A roller device for use with an overhead projector as described in claim 4, wherein said removable mounting means includes a clip member holding said axle in position on said end portion.

6. A roller device for use with an overhead projector as described in claim 5, wherein said roller member includes spring means to hold a roll of said transparent material in position.

* * * * *